US009314389B2

(12) United States Patent
Richter

(10) Patent No.: US 9,314,389 B2
(45) Date of Patent: Apr. 19, 2016

(54) THERAPEUTIC INTEGRATOR APPARATUS

(71) Applicant: Eileen Richter, Stillwater, MN (US)

(72) Inventor: Eileen Richter, Stillwater, MN (US)

(*) Notice: Subject to any disclaimer, the term of this patent is extended or adjusted under 35 U.S.C. 154(b) by 418 days.

(21) Appl. No.: 13/986,389

(22) Filed: Apr. 26, 2013

(65) Prior Publication Data

US 2014/0148319 A1 May 29, 2014

Related U.S. Application Data

(60) Provisional application No. 61/638,840, filed on Apr. 26, 2012.

(51) Int. Cl.
*G09B 19/00* (2006.01)
*A61G 13/00* (2006.01)

(52) U.S. Cl.
CPC .................................... *A61G 13/009* (2013.01)

(58) Field of Classification Search
USPC ............ 434/247, 255; 482/26, 27, 29, 51, 74, 482/77, 142, 143
See application file for complete search history.

(56) References Cited

U.S. PATENT DOCUMENTS

D363,325 S * 10/1995 Wilkinson ................... D21/797
5,788,606 A * 8/1998 Rich .................. A63B 69/0064 482/27
6,539,564 B1 * 4/2003 Hsia ..................... A47C 19/021 5/110
6,663,538 B2 * 12/2003 Yoon ........................ A63B 5/11 482/27
6,846,271 B2 * 1/2005 Publicover ............... A63B 5/11 182/139
6,942,487 B2 * 9/2005 Corbalis ............ A63B 69/0093 280/818
7,152,614 B2 * 12/2006 Kalnay ............... E04B 1/34305 135/128
7,182,713 B2 * 2/2007 Wang .................. G06F 3/03543 482/27
7,862,479 B2 * 1/2011 Goldwitz ............... A47B 3/002 403/174
8,608,479 B2 * 12/2013 Liu ........................ A61H 1/024 434/255
9,039,573 B2 * 5/2015 Smock ..................... A63B 5/11 482/27
9,056,215 B2 * 6/2015 Canales ................... A63B 5/11
2004/0071496 A1 * 4/2004 Chun Yueh .............. A63B 5/11 403/14
2006/0172861 A1 * 8/2006 Wang ....................... A63B 5/11 482/27
2009/0054211 A1 * 2/2009 Chiu ........................ A63B 5/11 482/27
2012/0100962 A1 * 4/2012 Alexander ............... A63B 5/11 482/27
2012/0244997 A1 * 9/2012 Thompson ............... A63B 5/11 482/27
2013/0316875 A1 * 11/2013 Howell .................... A63B 5/11 482/27
2014/0005003 A1 * 1/2014 Howell .................... A63B 5/11 482/27
2014/0315691 A1 * 10/2014 Turner ................. A63B 26/003 482/27
2014/0342880 A1 * 11/2014 Nelson ..................... A63B 5/11 482/27

* cited by examiner

*Primary Examiner* — Kurt Fernstrom
(74) *Attorney, Agent, or Firm* — Skinner and Associates; Joel Skinner

(57) ABSTRACT

A therapeutic integrator for use with children, toddlers and infants. The integrator includes a frame, and an expandable fabric top disposed at the top of the frame. The fabric top includes a fabric base and a fabric top supplement.

16 Claims, 14 Drawing Sheets

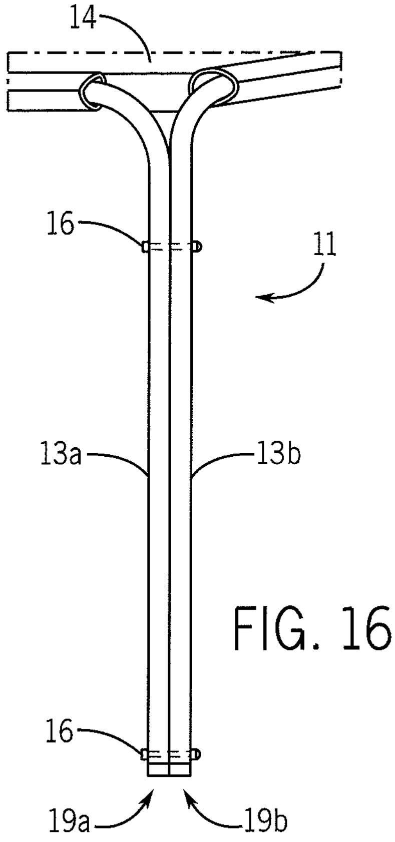
FIG. 16
FIG. 17
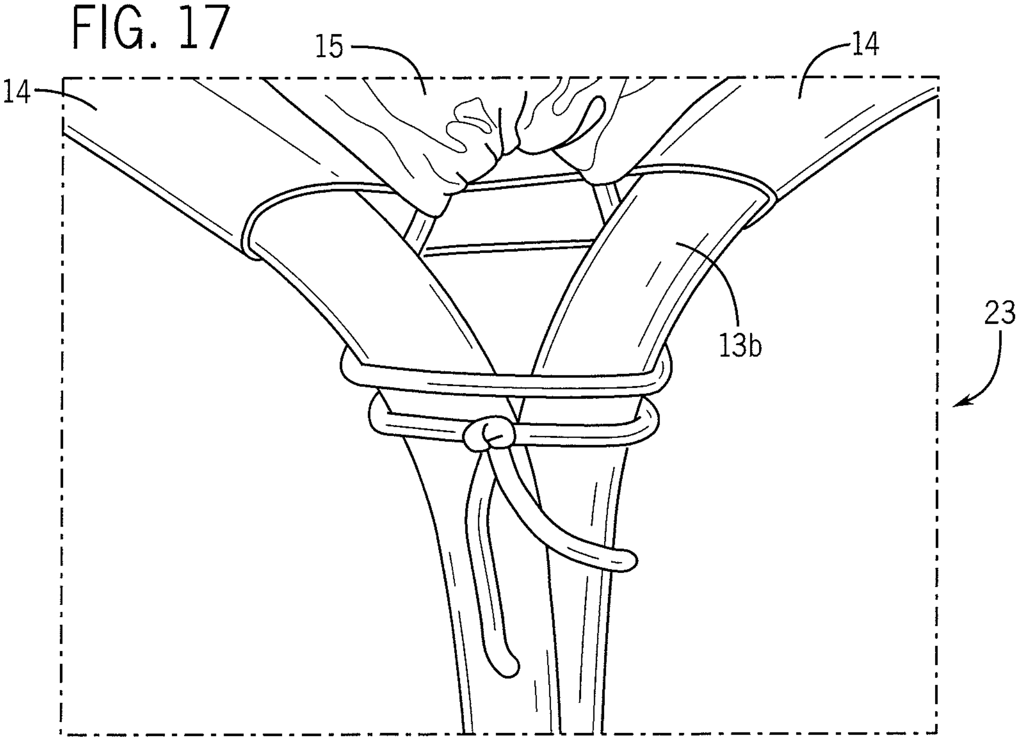

THERAPEUTIC INTEGRATOR APPARATUS

CROSS REFERENCE TO RELATED APPLICATIONS, IF ANY

This application claims the benefit under 35 U.S.C. §119 (e) of U.S. Provisional Patent Application Ser. No. 61/638, 840, filed Apr. 26, 2012, which is hereby incorporated by reference.

37 C.F.R. §1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to therapeutic systems, apparatus and methods. Particularly, the invention relates to occupational and sensory integration therapeutic systems, apparatus and methods for infants and children.

2. Background Information

Existing technology in this field is believed to have significant limitations and shortcomings.

All US patents and patent applications, and all other published documents mentioned anywhere in this application are incorporated by reference in their entirety.

BRIEF SUMMARY OF THE INVENTION

The present invention provides a therapeutic integrator apparatus and methods which are safe, durable, and effective, and which are believed to constitute an improvement over the background technology.

In one aspect, the invention provides a therapeutic integrator apparatus, comprising a frame and a flexible, expandable top connected to the frame, the top being constructed of fabric which is strong, exhibits four way stretch, and has shape retention.

In another aspect, the invention provides a portable therapeutic integrator apparatus for sensory motor therapy for infants and toddlers, comprising: portable therapeutic integrator apparatus for sensory motor therapy for infants and toddlers, comprising: A. a frame having four vertical legs extending downwardly from a substantially square top frame, the frame further being constructed of four readily attachable and detachable U-shaped modular units, each having two vertical sub-legs and a horizontal top member bridging the sub-leg members; and B. a flexible, expandable top connected to the frame, the top having a substantially square configuration, the top comprising: i. a bed member constructed of flexible expandable fabric which is strong, exhibits four way stretch, and has shape retention, the bed being connected to the frame along its periphery; and ii. at least one supplemental top member constructed of flexible expandable fabric which is strong, exhibits four way stretch, and has shape retention, the at least one supplemental top member being disposed on top of the bed and being connected to the frame at corner areas.

In a further aspect, method of therapeutic integration comprising the steps of providing a therapeutic integrator apparatus, introducing a patient to the apparatus, and permitting the patient to explore the apparatus while observing the patient, and wherein the integrator apparatus includes a frame and a flexible, expandable top connected to the frame, the top being constructed of fabric which is strong, exhibits four way stretch, and has shape retention.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 16 illustrates a frame leg assembly of the integrator.

FIG. 17 illustrates the connection of a pair of supplemental top walls to the frame.

DETAILED DESCRIPTION

Figure 1:
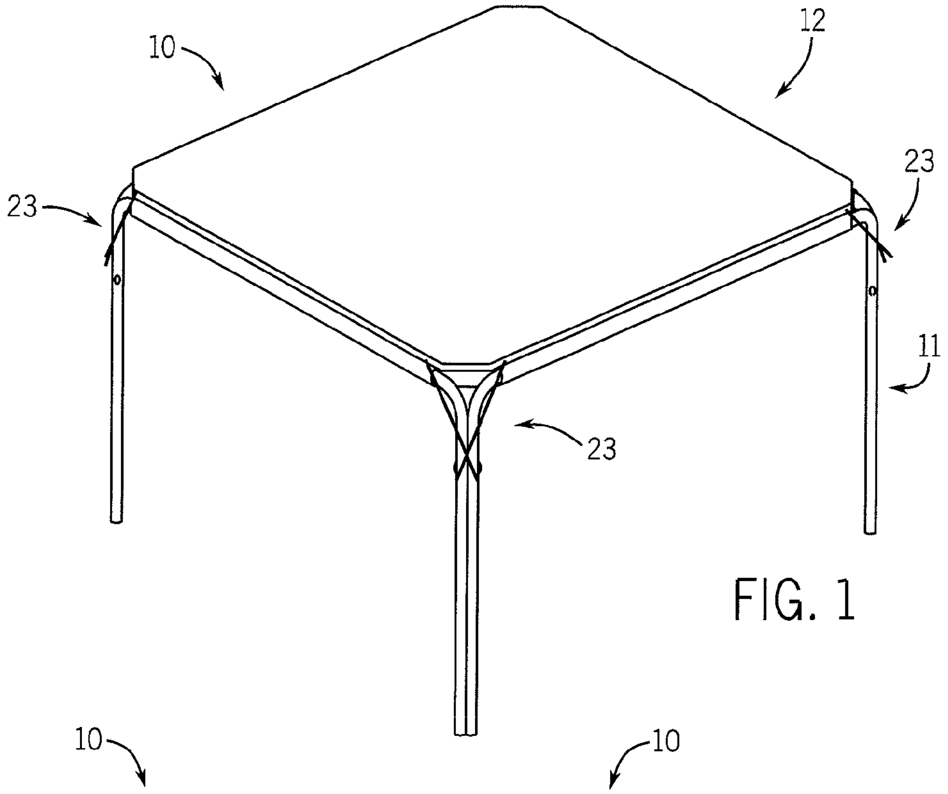
FIG. 1 is a perspective view of an embodiment of the therapeutic integrator apparatus of the present invention.
Figure 2:
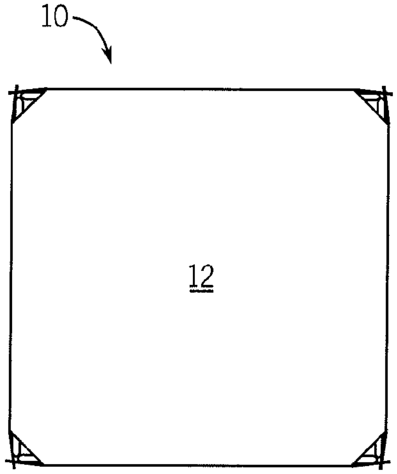
FIG. 2 is a top view of the integrator apparatus of FIG. 1.
Figure 4:
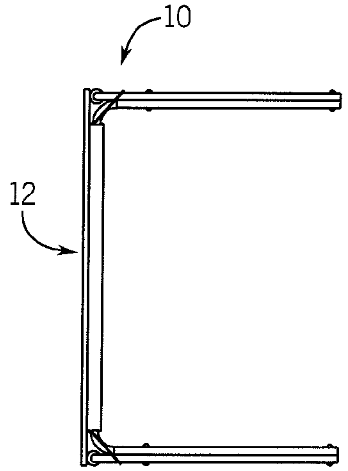
FIG. 4 is a side view of the integrator apparatus.
Figure 3:
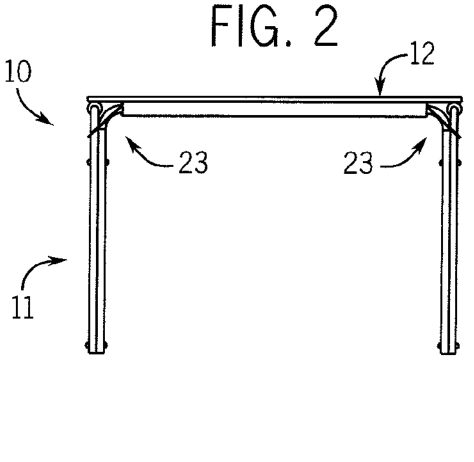
FIG. 3 is a front view of the integrator apparatus.
Figure 5:
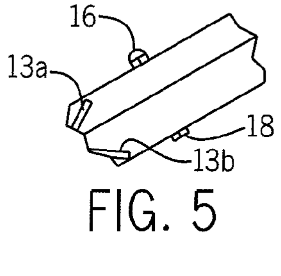
FIG. 5 is a detailed view of area—5—of FIG. 1.
Figure 6:
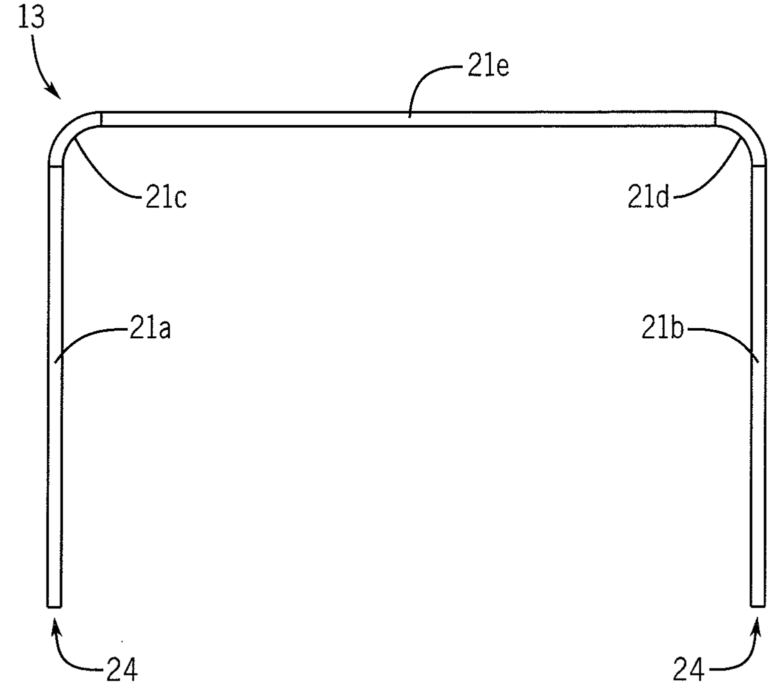
FIG. 6 is a side view of an embodiment of a frame leg of the integrator.
Figure 7:
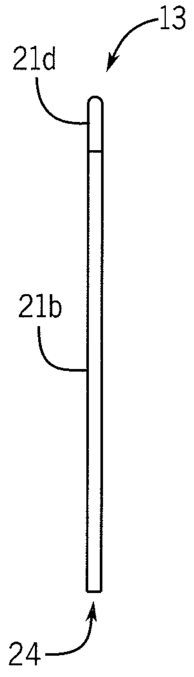
FIG. 7 is an end view of the frame leg.
Figure 8:
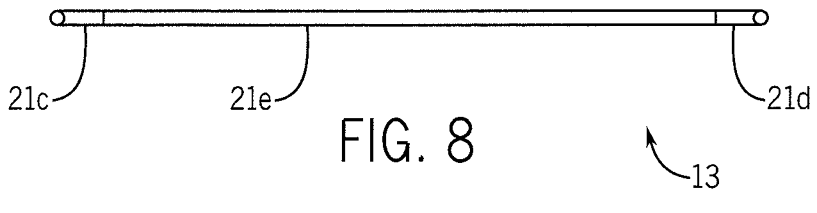
FIG. 8 is a top view of the frame leg.

Referring to FIG. 1, the invention provides a therapeutic integrator apparatus 10. The apparatus is designed and intended for use to provide integration therapy to infants and toddlers under the supervision of pediatric occupational (OT) and physical (PT) therapists. The system 10 is used as part of a developmental program including sensory motor experiences. The apparatus 10 is safe and effective for therapy. The apparatus 10 is easy to store, transport, deploy and take down.

The integrator 10 includes a frame 11 and a top 12. The frame 11 is constructed of rigid lightweight materials, such as a light weight metal or polymer. In the embodiment of FIGS. 1-17, the frame 11 preferably includes four (4) leg members 13 which are constructed of hollow tubular steel material. The top 12 preferably includes a base member 14 and at least one supplemental top member 15. The base 14 and one or more supplemental tops 15 are constructed of a strong, but expandable fabric.

Preferred dimensions of the apparatus are approximately 4 ft.×4 ft. to 5 ft×5 ft. The apparatus is sturdy and safe, and at the same time lightweight. The arrangement and interconnection of the components of the apparatus and assembly techniques employed, permit it to be assembled and disassembled quickly and easily so that they may be stored and transported.

Referring also to FIGS. 5 and 6-8, the frame 11 the frame 11 includes four (4) leg members 13*a-d*. The legs 13 are preferably constructed of metal tubing. Connectors 16 hold the leg members 14 together. The connectors 16 are preferably combinations of screws 17 and nuts 18. Tube plugs 19 preferably seal the bottom ends 24 of the leg 13 tubes. Each leg member 13 has a pair of vertical members 21*a* and *b*, a pair of radius members or portions 21*c* and *d*, and a horizontal member 21*e*. The frame 11 also preferably comprises a pad (not shown) disposed along a portion of the horizontal member 21*e*. Preferably, the pad is a tubular foam pad that is fit over the member 21*e*.

Figure 9:
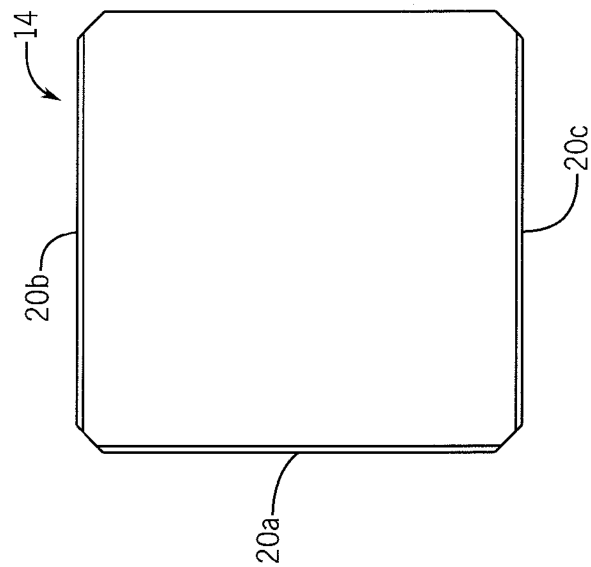
FIG. 9 is a top view of an embodiment of the base top wall or bed of the integrator.
Figure 11:
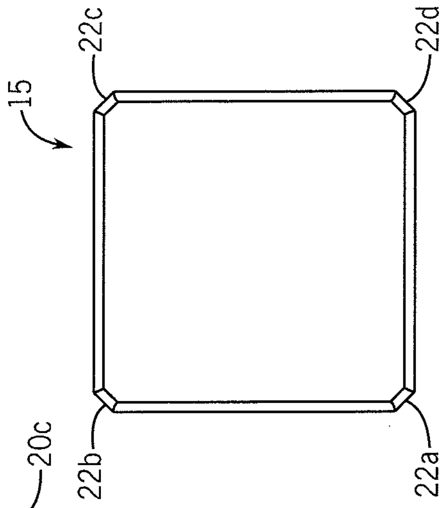
FIG. 11 is a diagram showing folding and stitching of the supplemental top wall.
Figure 10:
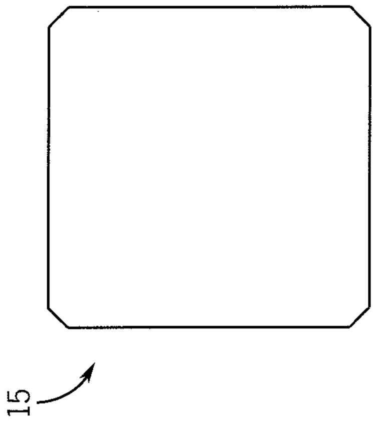
FIG. 10 is a top view of an embodiment of a supplemental top wall of the integrator.
Figure 12:
FIG. 12 is a side view of an embodiment of a frame top rail pad of the integrator.
Figure 13:
FIG. 13 is an end view of the pad.
Figure 14:
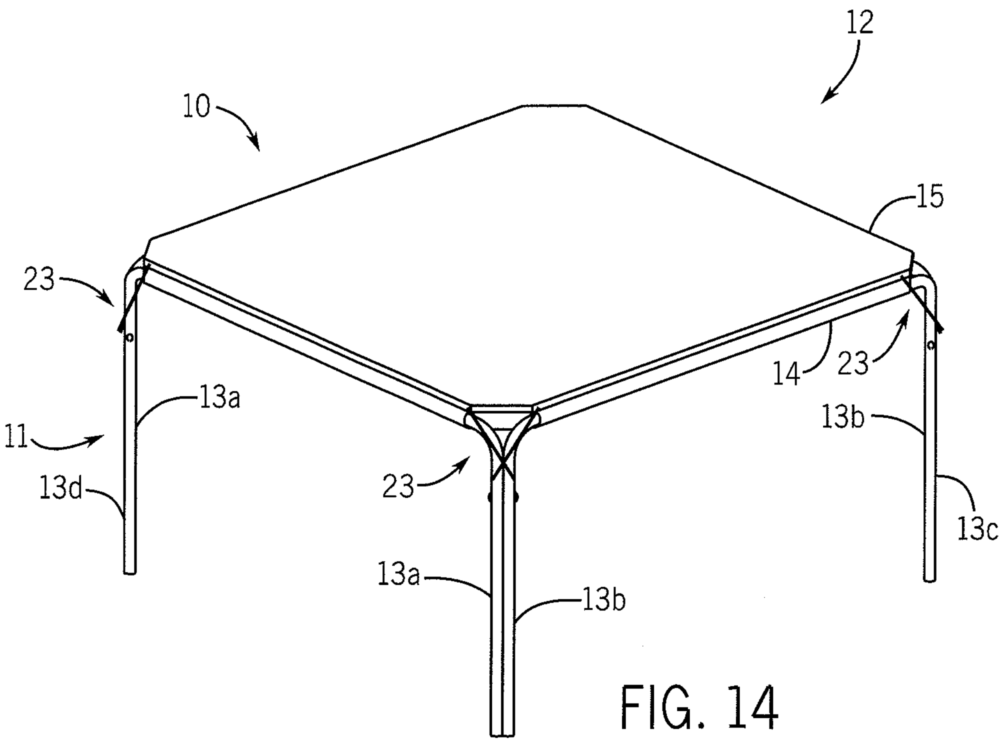
FIG. 14 is another perspective view of the integrator showing the base top wall and one supplemental top wall attached to the frame.
Figure 15:
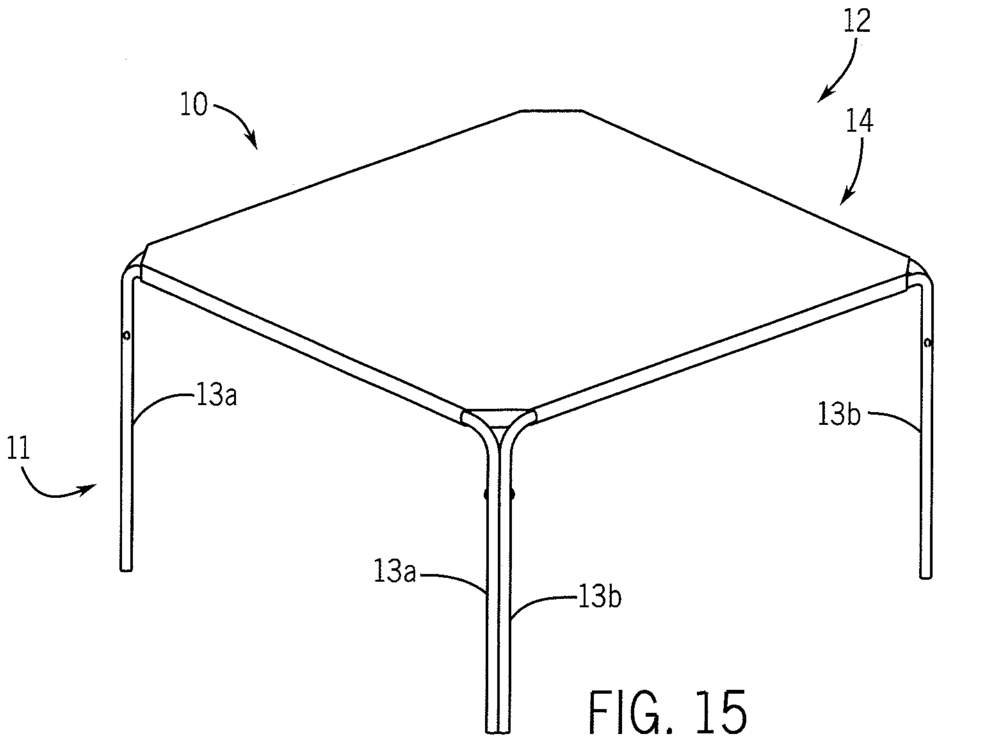
FIG. 15 is another view of the integrator showing only the base top wall attached to the frame.

Referring to FIGS. 9-11, the top 12 preferably comprises a base member (or bed) 14 and at least one supplemental top member 15. Preferably, the top 12 includes two (2) supplemental top members 15*a* and 15*b*. Up to four (4) supplemental top members 15 may be applied to the bed 14. The bed 14 provides a base level of support for the patient. The top members 15 have two functions. The first is to reduce the distance that the patient sinks into the bed 14, so for example the patient initially is disposed at the level shown in FIGS. 21A-B when placed on the apparatus 10. The second function of the top members 15 is to increase the amount of resistance that the patient experiences when moving about the apparatus 10. Applicant found the unexpected result that even with less depression of the top by the weight of the patient, the more tops 15 applied, the more resistance the patient experienced moving about. Resistance is beneficial in integration therapy. Applicant found that at least one top 15 is required for effective therapy. Two tops 15 are preferred. Additional tops are only used with larger patients. The base 14 and one or more supplemental tops 15 are constructed of a fabric. Importantly, the fabric has a combination of properties including both four way (4-way) stretch (or expansion) along the plane of the fabric, and simultaneously strength. The fabric preferably also has a shape retention property so that after it is stretched, it returns to its normal state. In the most preferred embodiment, the fabric is Spandex or elastane synthetic fabric constructed of a polyurethane-polyurea copolymer. An exemplary spandex is LYCRA Brand elastane. The base 14 preferably has sleeve members 20 disposed about its peripheral sides for receiving the top portions 21 of the leg members 13. The top members 15 preferably have sleeve members 22 at their corners for receiving tie members 23.

The interconnection of the base member 14 and the supplemental top members 15 with the frame 11 is shown in FIGS. 14-17. First, a leg 13*a* is threaded through the an open sleeve 20 end of the base 14. Next, the base 14 sleeve is slidingly adjusted so that sleeve is disposed along the length of the sleeve 20. Then, a second leg, 13*b* for example, is threaded through an adjacent corner of the base 14. The complementary vertical members of the adjacent legs 13*a* and 13*b* are aligned to check that bolt apertures are aligned for receiving connectors 16. This process is repeated for the remaining two legs 13*c* and 13*d*. After the base 14 is coupled to all four legs 13, the vertical members thereof are secured via the connectors 16 as shown in FIG. 16. Preferably, there are at least two connectors 16 per pair of vertical members. A first top 15 is placed on the base 14 and secured at its corners via straps or strings as best shown in FIG. 17. A preferred strap is a $\frac{3}{16}^{th}\times 26^{1/2}$ rope constructed of nylon 6/6. A second top 15 is preferably added over the first top. Because babies often create messes and soil the apparatus during use, and for optimal hygiene, the apparatus 10 is designed to be simple and quick to take down so that the spandex fabric top 12 materials may be laundered regularly. The top member or top most member of a set of top members may be removed more frequently for cleaning, including as often as between each patient.

Figure 18:
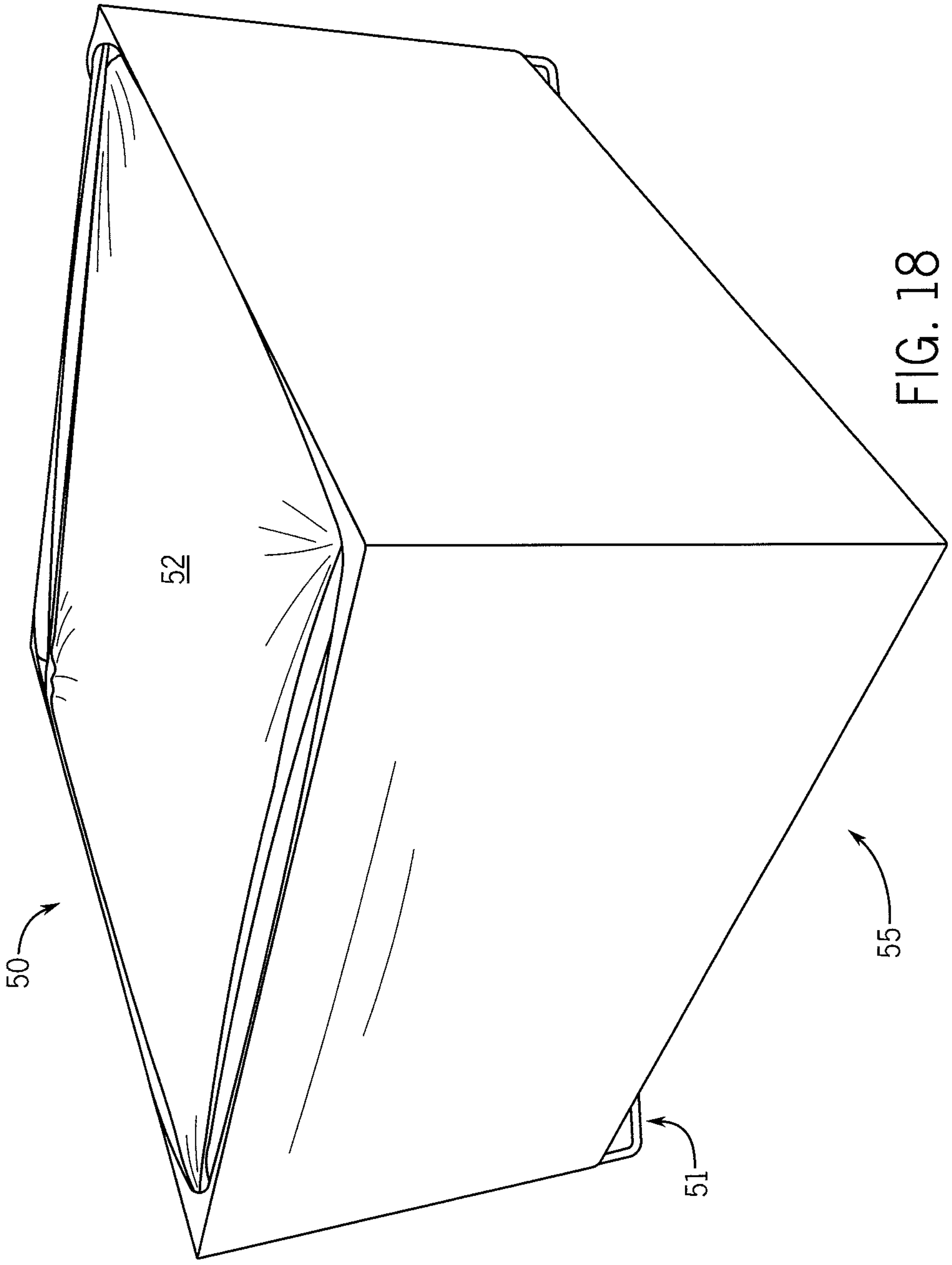
FIG. 18 is a perspective view of a second embodiment of the therapeutic integrator apparatus of the present invention, fully assembled.

Referring to FIG. 18, an alternative, second embodiment of the therapeutic integrator apparatus 50 also includes a frame 51 and a top 52 including a base member 53 and at least one supplemental top member 54. The apparatus also preferably comprises a side wall member 55. The frame 51 of this embodiment constructed of rigid lightweight polymer rods (preferably fiberglass) and metal connectors. The side walls, base top and one or more supplemental tops are constructed of fabric, preferably Lycra. Connections are preferably made by sewn seams and sleeves, and by cords. Preferred dimensions of the tops are approximately 4 ft.×4 ft. to 5 ft×5 ft.

Figure 19:
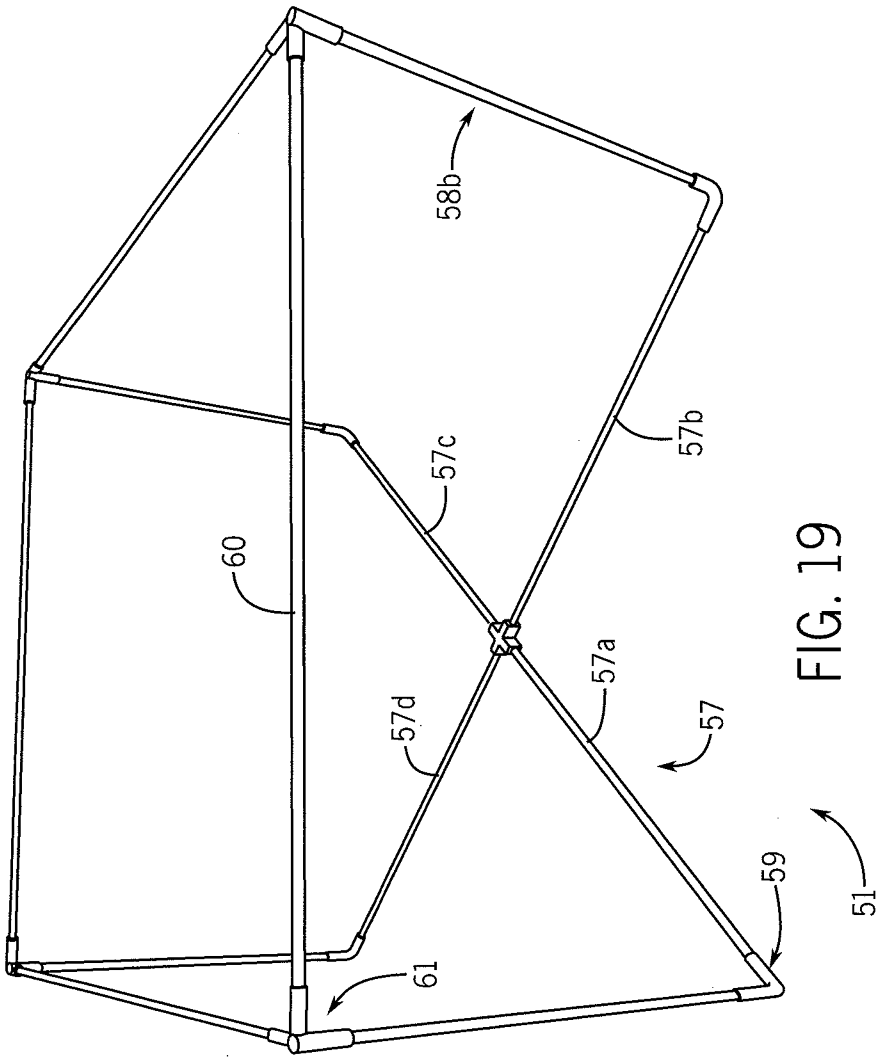
FIG. 19 is a perspective view showing the frame set up, with the base deployed on the floor, upright members connected to the base at 4 corners of the base via L-angle members, and a square top assembly arranged from 4 top rods connected via 3-axis connectors attached to the top ends of each upright member.

FIG. 19 shows the frame 51 set up, with the base 57 (rods 57*a-d* and connector 57*e*) deployed on the floor, upright members 58 connected to the base 57 at 4 corners of the base 57 via L-angle members 59, and a square top arrangement from 4 top rods 60 connected via 3-axis connectors 61 attached to the top ends of each upright member 58.

Figure 20:
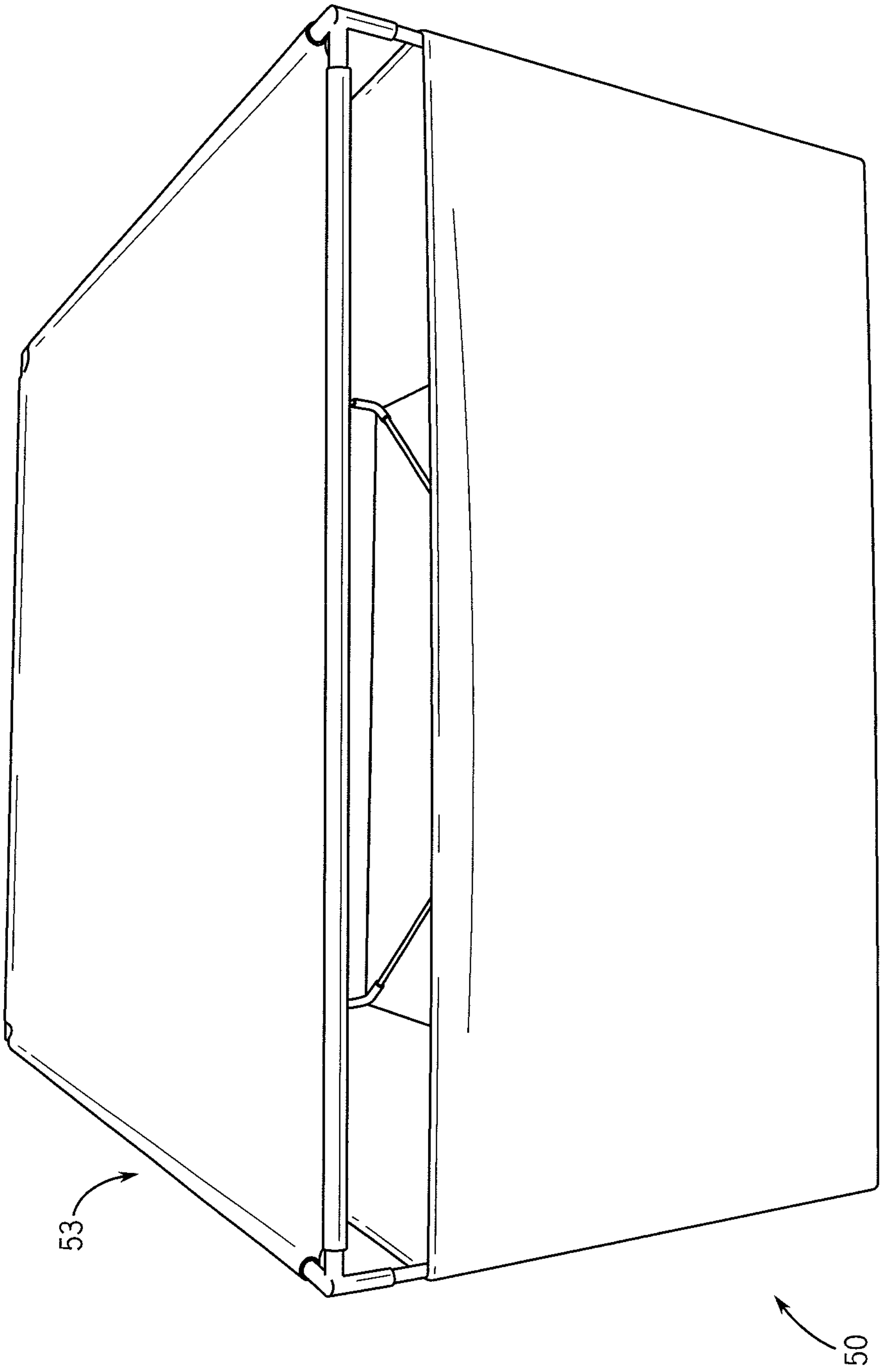
FIG. 20 is a perspective view showing the integrator apparatus partially assembled with the frame completed, the base top wall horizontally deployed at the top of the frame, and the side walls vertically deployed around the sides of the frame contacting the upright members.

FIG. 20 shows the integrator apparatus partially assembled with the frame 51 completed, the base top wall 53 horizontally deployed at the top of the frame, and the side wall member 55 vertically deployed around the sides of the frame contacting the upright members.

Figure 21A:
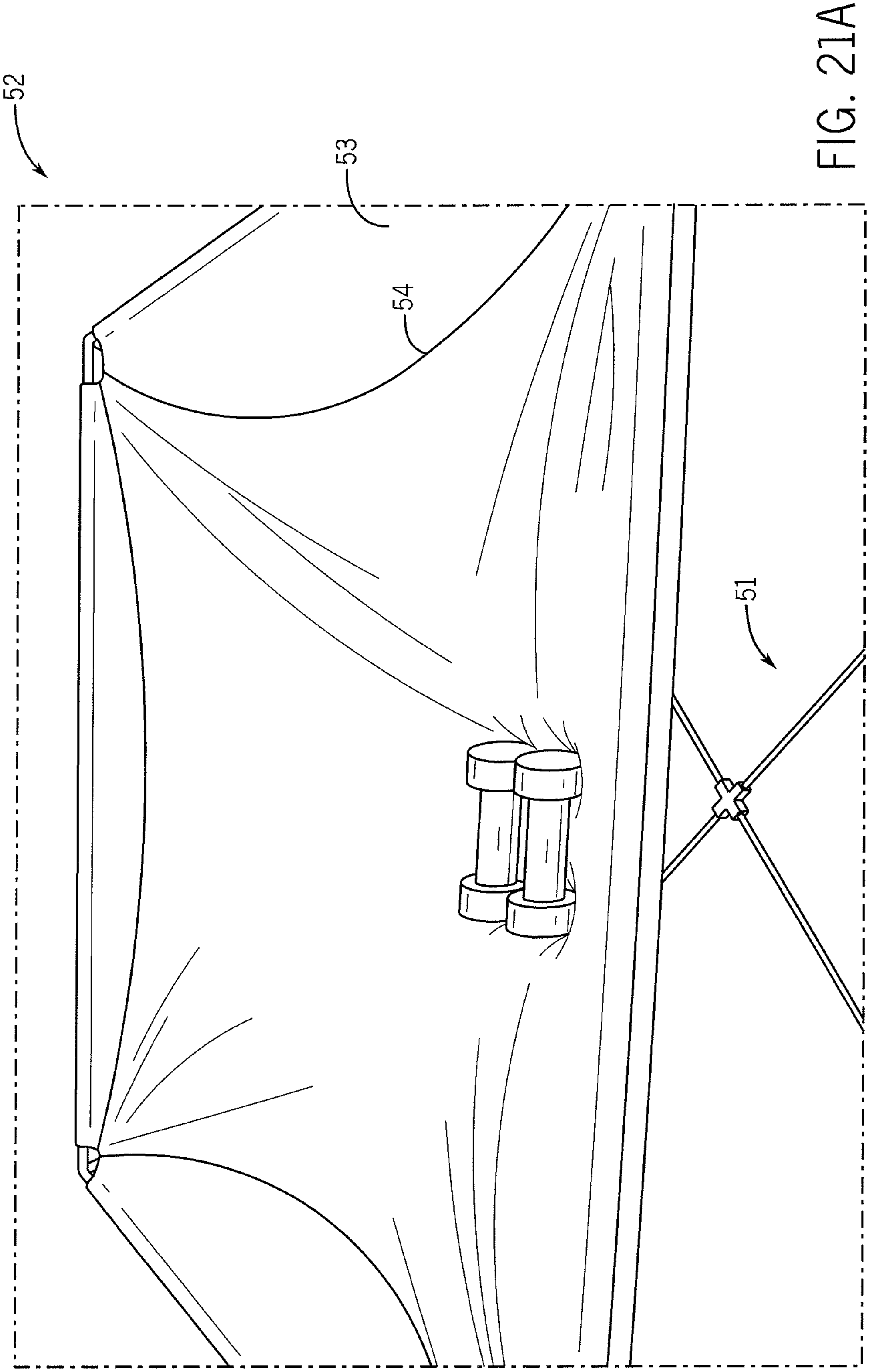
FIG. 21A is a top view of the apparatus with the supplemental top wall disposed over the base top wall (the side walls being removed to show depression of the top members) and further having a pair of weights simulating the approximate weight of an infant, operatively disposed on the apparatus.
Figure 21B:
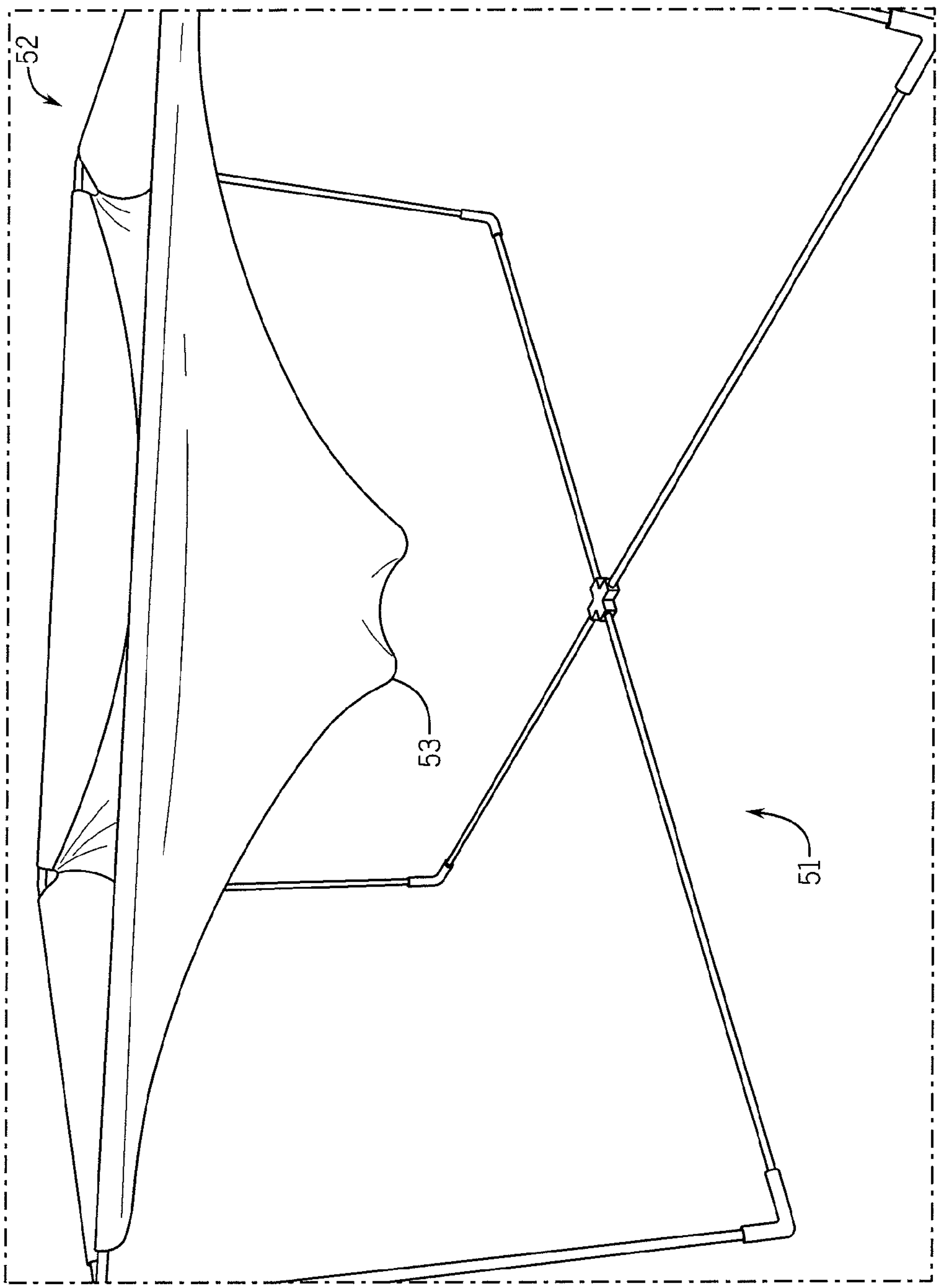
FIG. 21B is a side view of the elements shown in FIG. 21A.
Figure 22:
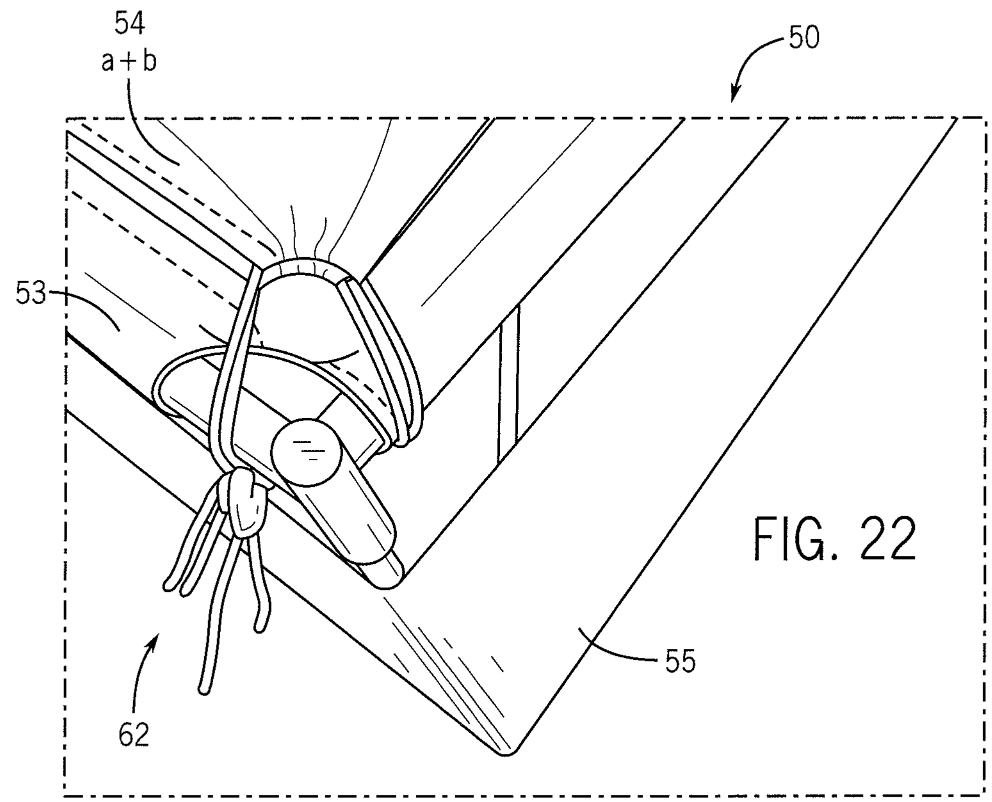
FIG. 22 is a detailed view of the a corner of the apparatus, taken from the top, and showing an embodiment of the attachment of two (2) supplemental top walls to the frame, over the base top wall.

FIGS. 21A and 21B are top and side views, respectively, of the apparatus with the supplemental top wall disposed over the base top wall, wherein the side walls are removed, and further having a pair of weights simulating the approximate weight of an infant, operatively disposed on the apparatus. FIG. 22 is a detailed view of the a corner of the apparatus, showing the attachment of two (2) supplemental top walls 54 to the frame, over the base top wall 53 and secured by cords 62. The apparatus 10 is intended for use with infants and toddler approximately 7 months to 2 years of age weighing 25 to 30 pounds, and heights 25-27 inches. The device 10 has a maximum capacity of approximately 50 pounds.

Figure 23:
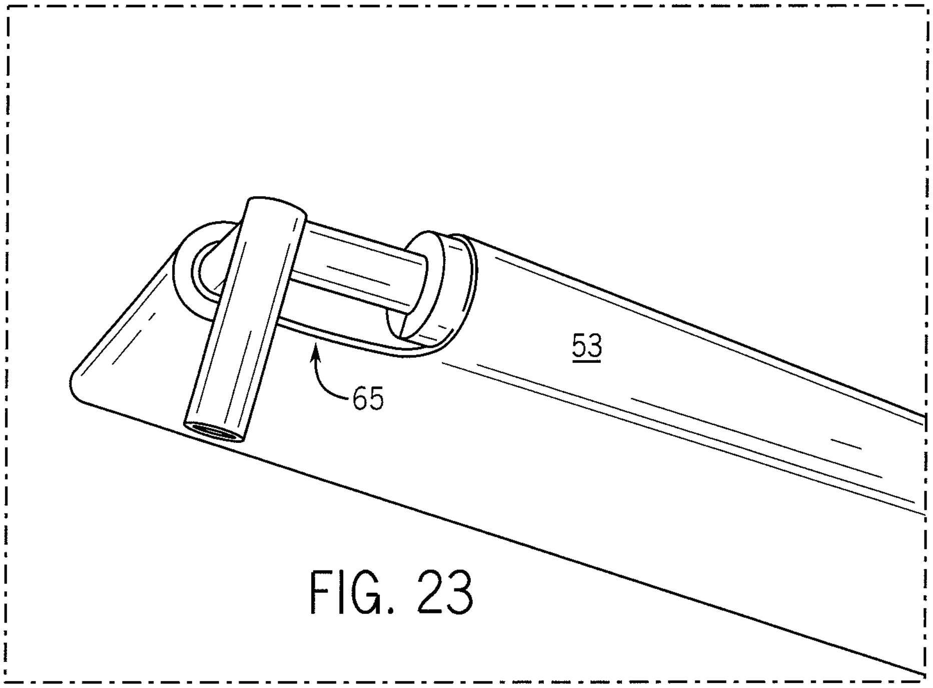
FIG. 23 is a side view of an alternative embodiment of the top of the apparatus (for use with the embodiment shown and described above) wherein a pad is disposed around the top rods, the pads being disposed within the peripheral sleeves of the base top wall.
Figure 24:
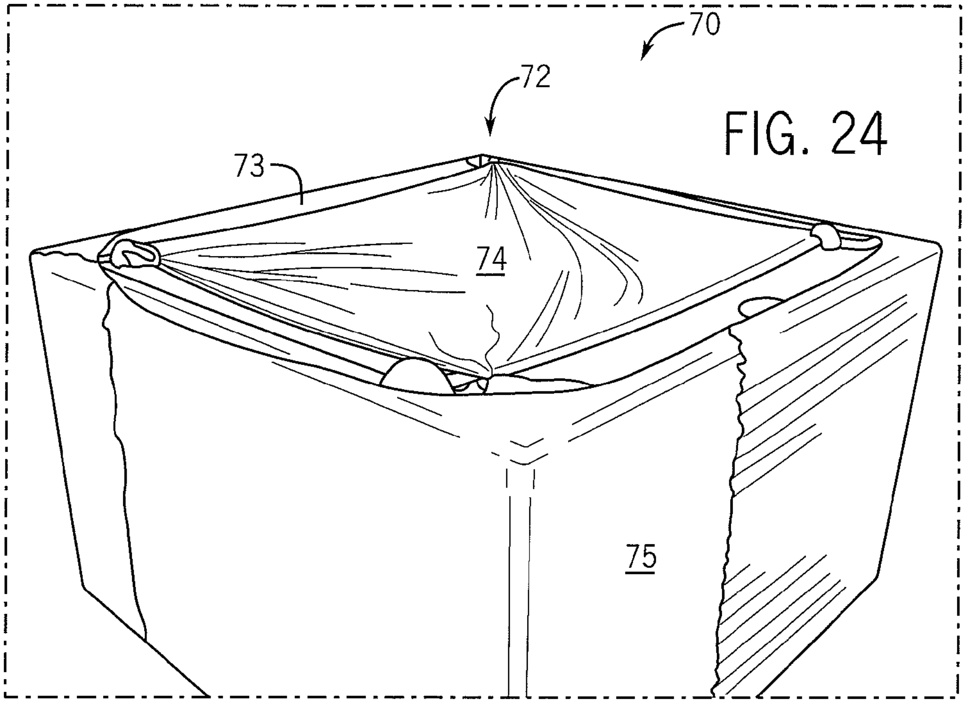
FIG. 24 is a perspective view of a third embodiment of the therapeutic integrator.
Figure 25:
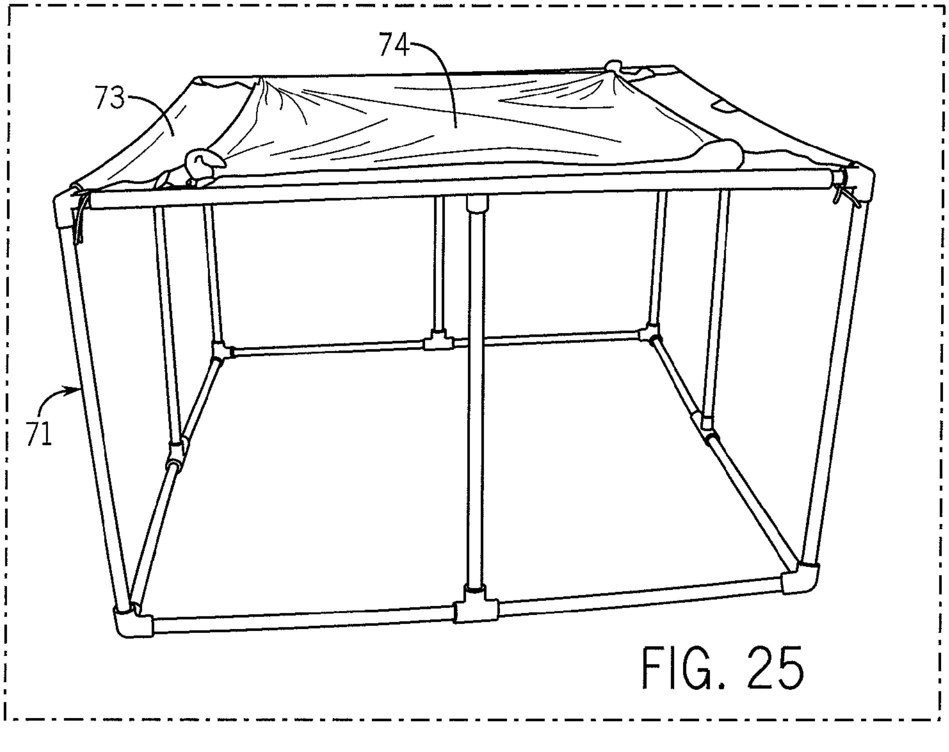
FIG. 25 is a front view of the integrator embodiment shown in FIG. 24, wherein the side walls are removed to show an alternative embodiment of the frame for use with an integrator.
Figure 26:
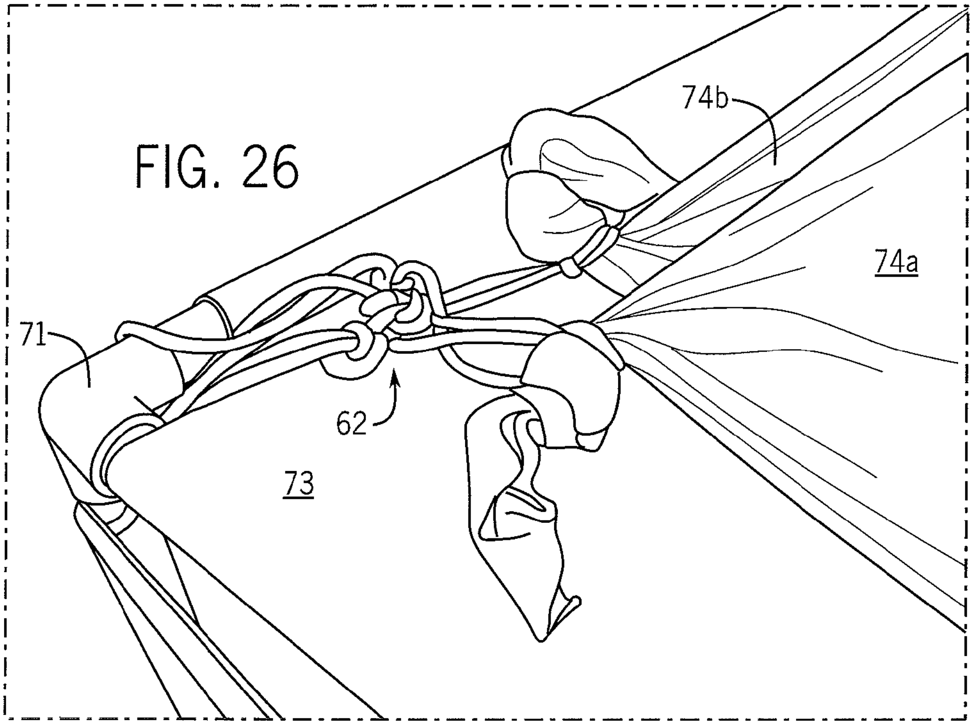
FIG. 26 is a detailed view showing an embodiment of the method and arrangement for coupling two supplemental top covers with a base top cover.
Figure 27:
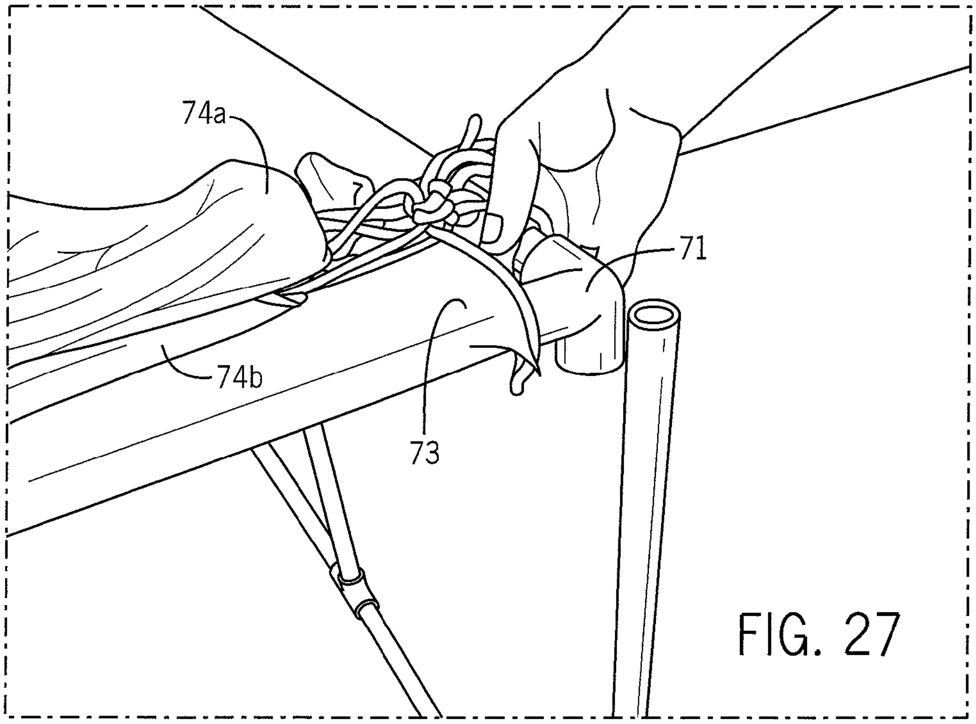
FIG. 27 shows an alternative embodiment of the frame connection at a corner thereof.
Figure 28:
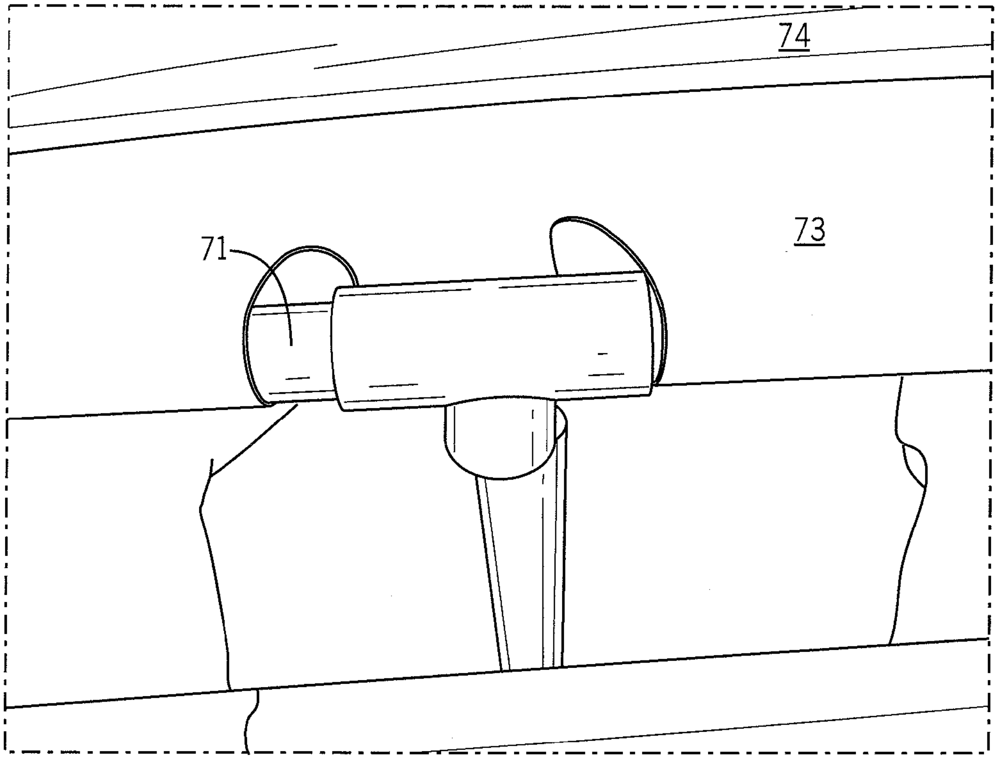
FIG. 28 shows an alternative embodiment of the frame connection at a middle portion thereof.

FIG. 23 is a side view of an alternative embodiment of the top of the apparatus for use with the embodiment of FIGS. 1-5, wherein a pad 65 is disposed around the top rods, the pads being disposed within the peripheral sleeves of the base top wall. A preferred pad 65 is constructed of Buna-N/PVC rubber material.

FIGS. 24-28 show an alternative embodiment of the therapeutic integrator apparatus 70—of the invention. The device 70 has a frame 71 (constructed of PVC pipe in this embodiment), top 72 consisting of a sleeved base 73 and a pair of cord tied supplemental members 74, and a stretched side wall 75 The components and method of assembly is described in the following two (2) non-limiting examples.

Specifications and Deployment for 4'×4' Apparatus of FIGS. 14-18

Frame: (currently) ¾" PVC pipe
(8) upright pipes—2.5 feet in length
(16) horizontal pipes—2 feet in length
(8) Corner connectors (S×S×S—90° T)
(8) T connectors
Lycra piece-42"×84" (52" piece allows for potential padding)

1. Fold in half to make a square.
2. Fold again to locate center and clip a hole in the bottom layer. Repeat on other edges. Open to 42"×42" square.
3. Stitch (½") the two sides from the fold end (leave ½" from each end open)
4. Turn seams inside and stitch the final opening leaving the corners open.

Specifications for 5'×5' Apparatus of FIGS. 14-18

Frame: (currently) ¾" PVC pipe
(8) upright pipes—2.5 feet in length
(16) horizontal pipes—2.5 feet in length
(8) Corner connectors (S×S×S—90° T)
(8) T connectors Lycra piece-52"×104"

1. Fold in half to make a square.
2. Fold again to locate center and clip a hole in the bottom layer. Repeat on other edges. Open to 52"×52" square.
3. Stitch (½") the two sides from the fold end (leave ½" from each end open).
4. Turn seams inside and stitch the final opening leaving the corners open.

It is within the purview of the invention that the frame could be constructed of other lightweight, rigid materials. A frame could be constructed to hold older children, adolescents and even adults, made of galvanized steel or aluminum pipe, which is assembled by welding or fittings (either friction fit or connected by screws, bolts or the like). Although the apparatus of the invention has been described and shown as optimally having a square top configuration, it is within the purview of the invention that the apparatus have a triangular, pentagonal, hexagonal or circular shape.

A preferred therapeutic use involves placing a child on the device on their back with feet towards the center and head towards the frame. In this position, the child receiving therapy should be semi-reclined. In due course, the child should spontaneously begin to explore the top 12. If the child doesn't move or begin to explore by feeling the top and looking around, the therapist may gently rock the child and top. Rocking may be done head to toe and or side to side. The therapist may wish to encourage the child to move, climb, rock, roll or undergoes other motions.

The apparatus of the invention provide a beneficial sensory motor experience to toddlers and infants. Therapeutic benefits of the apparatus and method of use include:

Triggers the child's drive to explore and challenge gravity using the total body.

Promotes elongation, activation, strengthening and grading of core muscles of the body.

Develops strength and stability of the shoulders, arms and hands through grasp, weight bearing, and weight shifting.

Promotes 3 dimensional, refined movement through elongation and gradation

Develops strength and stability of the pelvis, knees and feet through weight bearing, expansion, weight shift, and gradation, which leads to 3 dimensional, refined movement.

Facilitates stability with mobility throughout the body (no fixing/holding or compensatory patterns).

Vestibular, somatosensory integration is promoted with each action for improving balance and coordination.

Increases depth and variability of respiration; encourages vocalization.

The child's movement actively facilitates integration of primitive reflexes allowing the emergence of 3 dimensional motor patterns.

The child's movements foster controlled gradation of multiple muscle synergies, i.e. top/bottom, left/right, front/back, diagonal/rotational.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A therapeutic integrator apparatus for sensory motor therapy for infant and toddler patients, comprising a frame and a flexible, expandable top connected to the frame, the top including (i) a bed member constructed of flexible expandable fabric which is strong, exhibits four way stretch, and has shape retention, the bed being connected to the frame along its periphery, and (ii) at least one supplemental top member constructed of flexible expandable fabric which is strong, exhibits four way stretch, and has shape retention, the at least one supplemental top member being disposed on top of the bed member and being connected to the frame at corner areas, the bed member and the at least one supplemental top member being constructed of elastane synthetic fabric, whereby in use the infant or toddler patient sinks into the top, maintains contact with the top, and experiences resistance to movement on the top.

2. The therapeutic integrator apparatus of claim 1, wherein the frame has at least three substantially vertical legs connected to a top frame.

3. The therapeutic apparatus of claim 2, wherein the frame further comprises a bottom base, the bottom base connected to bottom portions of each leg.

4. The therapeutic apparatus of claim 3, wherein the bottom base has an X-shaped configuration.

5. The therapeutic apparatus of claim 3, wherein the bottom base has a square configuration.

6. The therapeutic apparatus of claim 2, wherein the frame is constructed of readily attachable and detachable modular linear components connectible by connectors.

7. The therapeutic apparatus of claim 2, wherein the frame is constructed of at least three attachable and detachable U-shaped modular units, each unit having two vertical sub-legs and a horizontal top member bridging the sub-leg members.

8. The therapeutic apparatus of claim 2, wherein the frame is constructed of steel tubes.

9. The therapeutic apparatus of claim 2, wherein the frame is constructed of fiberglass poles.

10. The therapeutic apparatus of claim 2, wherein the frame is constructed of PVC pipe.

11. The therapeutic apparatus of claim 1, wherein the bed member has peripheral sleeves connected to the frame, and wherein the supplemental top member has corner anchors connected to the corners of the frame by tie cords.

12. The therapeutic apparatus of claim 1 wherein there are two supplemental top members disposed on top of each other.

13. The therapeutic apparatus of claim 1, wherein the elastane synthetic fabric is LYCRA Brand elastane synthetic fabric.

14. The therapeutic apparatus of claim 2, further comprising a side wall surrounding the legs constructed of fabric which is strong, exhibits four way stretch, and has shape retention.

15. The therapeutic apparatus of claim 2, wherein the top frame is padded.

16. A portable therapeutic integrator apparatus for sensory motor therapy for infant and toddler patients, comprising:

A. a frame having four vertical legs extending downwardly from a substantially square top frame, the frame further being constructed of four readily attachable and detachable U-shaped modular units, each having two vertical sub-legs and a horizontal top member bridging the sub-leg members, the frame further comprising a bottom base connected to the bottom portions of each leg, the bottom base having an X-shaped configuration, and wherein the legs, top frame and bottom base are constructed of fiberglass poles;

B. a flexible, expandable top connected to the frame, the top having a substantially square configuration, the top comprising:

i. a bed member constructed of flexible expandable fabric which is strong, exhibits four way stretch, and has shape retention, the bed being connected to the frame along its periphery;

ii. at least one supplemental top member constructed of flexible expandable fabric which is strong, exhibits four way stretch, and has shape retention, the at least one supplemental top member being disposed on top of the bed and being connected to the frame at corner areas; and iii. wherein the bed member has peripheral sleeves connected to the frame, and wherein the supplemental top member has corner anchors connected to the corners of the frame by tie cords;

C. a side wall surrounding the legs constructed of fabric which is strong, exhibits four way stretch, and has shape retention;

D. wherein the bed member, the at least one supplemental top member and the side wall are constructed of elastane synthetic fabric; and E. whereby in use, the infant or toddler patient sinks into the top, remains in contact with the top, and experiences resistance to movement on the top.

* * * * *